(12) United States Patent
Guo

(10) Patent No.: US 7,420,685 B1
(45) Date of Patent: Sep. 2, 2008

(54) DISPERSION-FREE, AUTOMATICALLY PHASE-MATCHED, AND BROAD SPECTRAL-BAND FEMTOSECOND AUTOCORRELATION TECHNIQUE

(75) Inventor: Chunlei Guo, Rochester, NY (US)

(73) Assignee: University of Rochester, Rochester, NY (US)

( * ) Notice: Subject to any disclaimer, the term of this patent is extended or adjusted under 35 U.S.C. 154(b) by 307 days.

(21) Appl. No.: 11/413,137

(22) Filed: Apr. 28, 2006

Related U.S. Application Data

(60) Provisional application No. 60/675,918, filed on Apr. 29, 2005.

(51) Int. Cl.
*G01N 21/25* (2006.01)

(52) U.S. Cl. .................................... 356/445; 356/447
(58) Field of Classification Search ................. 356/445
See application file for complete search history.

(56) References Cited

U.S. PATENT DOCUMENTS

2003/0148391 A1* 8/2003 Salafsky ..................... 435/7.2

* cited by examiner

*Primary Examiner*—Roy M Punnoose
(74) *Attorney, Agent, or Firm*—Blank Rome LLP

(57) ABSTRACT

Two optical signals are autocorrelated by causing them to be incident on a metal surface, where they generate a second (or higher) harmonic signal. The resulting harmonic signal is detected by a photomultiplier tube or the like. The harmonic signal generation on the metal surface is phase-matched and dispersion free and can be performed over a wide range of wavelengths.

16 Claims, 9 Drawing Sheets

DISPERSION-FREE, AUTOMATICALLY PHASE-MATCHED, AND BROAD SPECTRAL-BAND FEMTOSECOND AUTOCORRELATION TECHNIQUE

REFERENCE TO RELATED APPLICATION

The present application claims the benefit of U.S. Provisional Patent Application No. 60/675,918, filed Apr. 29, 2005, whose disclosure is hereby incorporated by reference in its entirety into the present disclosure.

STATEMENT OF GOVERNMENT INTEREST

The work leading to the present invention was supported by DARPA under Award No. W911INF-04-1-0199. The government has certain rights in the invention.

FIELD OF THE INVENTION

The present invention is directed to an optical autocorrelation technique and more particularly to such a technique using second harmonic generation (SHG) on a metal surface.

DESCRIPTION OF RELATED ART

Temporal characterization of sub-picosecond laser pulses can be most conveniently achieved by using optical auto- or cross-correlation techniques. More advanced measurements, such as those that can record both intensity and phase information, are also based on the simple correlation platform.

Traditional optical autocorrelators typically employ the Michelson or the Mach-Zehnder interferometric geometry and use a nonlinear crystal to perform second harmonic generation (SHG) from two temporally overlapped pulses. Correlation functions are obtained by recording the SHG intensity as a function of the time delay between the two pulses. These correlation functions allow one to deduce the duration of short pulses, assuming a certain pulse shape.

The autocorrelation technique, although straightforward, has a number of disadvantages for characterizing femtosecond pulses. The most significant disadvantage originates from the phase-matching requirement, which limits the spectral bandwidth that can be characterized simultaneously. For example, an ultrashort pulse with a 40-nm bandwidth will in most cases suffer some cutoff at its spectral edge simply because a nonlinear crystal only optimizes SHG over a certain wavelength range determined by the orientation of the crystal c axis. Even if the crystal orientation is adjusted, phase matching restricts the wavelength range over which a nonlinear crystal can be used (typically this range is restricted to at most 1000 nm). Therefore, pulses at different central wavelengths (e.g., 800 vs. 1500 nm) often require different types of crystals. In fact, no crystal is known to work efficiently for wavelengths shorter than 400 nm. Furthermore, dispersion in a nonlinear crystal itself introduces errors in ultrashort pulse measurements. Moreover, nonlinear crystals are usually quite expensive, especially those made for special purposes (e.g., thin crystals needed for reducing dispersion).

Recently, a technique based on two-photon absorption (TPA) inside a photodetector has been developed for autocorrelation measurements. This technique overcomes several limitations of the nonlinear crystal-based technique, as it is constrained by a much more relaxed phase-matching condition. However, it requires semiconductor materials whose bandgap energy is larger than one-photon energy but smaller than two-photon energy ($h\nu < E_g < 2h\nu$). Therefore, different materials are still needed for different wavelengths. This feature may restrict the suitability of such a technique when pulses have a super-broad spectrum such as those produced from photonic-crystal fibers. Furthermore, although dispersion is greatly reduced in the TPA technique, light still needs to penetrate into the semiconductor materials over a certain depth to generate an overall output signal. This dispersion still poses a less desirable effect in ultrashort pulse measurements.

SUMMARY OF THE INVENTION

It is therefore an object of the present invention to overcome the above-noted shortcomings of the prior art.

To achieve the above and other objects, the present invention is directed to a noncollinear autocorrelation scheme based on SHG from metal surfaces which has significant advantages over previous techniques. The basic principle is as follows. Inside bulk metals, the inversion symmetry prevents SHG because the second-order susceptibility from electric dipoles vanishes. However, this symmetry is broken at metal surfaces, and SHG can be generated from the surface atomic layers. When a laser beam is incident onto a metal film from a certain angle, surface SHG will be generated collinearly along the direction of the reflected beam. However, when two beams are incident onto the metal sample with equal angles but from opposite directions, surface SHG will be generated in the direction normal to the metal surface, bisecting the angle between the two incident beams. This SHG is dictated by the energy and momentum conservation laws, when one photon from each beam is absorbed simultaneously.

This surface SHG autocorrelation scheme provides a number of unique advantages. First, since SHG is generated from a few top surface layers, the phase-matching condition is automatically fulfilled. Second, the measurement is virtually dispersion free since only a few atomic layers are involved, and the reflected signal is collected (avoiding materials dispersion to transmit light). Third, SHG can be generated from a metal surface over an extremely broad wavelength range. In principle, the SHG signal can be produced from far infrared to deep ultraviolet, up to the plasma frequency of the metal used (e.g., about 10 eV for gold). This broad spectral bandwidth property is the most significant advantage over other existing techniques and it promises a unique way to characterize ultrabroad-band short pulses that may not be accomplished otherwise.

The invention provides a noncollinear autocorrelation setup based on SHG from metal surfaces that eliminates background offset. A high efficiency has been demonstrated in generating autocorrelation SHG traces that is nearly comparable to most existing autocorrelation techniques. Spectral response of this metal-based autocorrelation technique is also measured and is significantly better compared to nonlinear crystal based autocorrelation techniques.

High-quality autocorrelation traces are obtained with pulse energies as small as only 64 pJ (corresponding to an intensity of about 6.5 MW/cm$^2$), resulting in an efficiency comparable with current nonlinear-crystal-based measurements. However, the demonstrated scheme has significant advantages over the existing autocorrelation techniques inasmuch as it is dispersion-free, provides automatic phase matching, and is capable of responding over an extremely wide spectral range. This technique not only provides an alternative for current femtosecond pulse measurements, but also is likely to emerge as a strong candidate for temporally characterizing any light source with a super-broad spectrum, such as those produced from photonic-crystal fibers.

At least one embodiment uses a collinear setup and obtains both second- and third-order interferometric autocorrelation measurements for pulses as short as 18 fs, a pulse width that is only limited by the femtosecond oscillator output of the particular equipment used.

BRIEF DESCRIPTION OF THE DRAWINGS

Two preferred embodiments of the present invention will be disclosed in detail with reference to the drawings, in which.

DETAILED DESCRIPTION OF THE PREFERRED EMBODIMENTS

Figure 1:
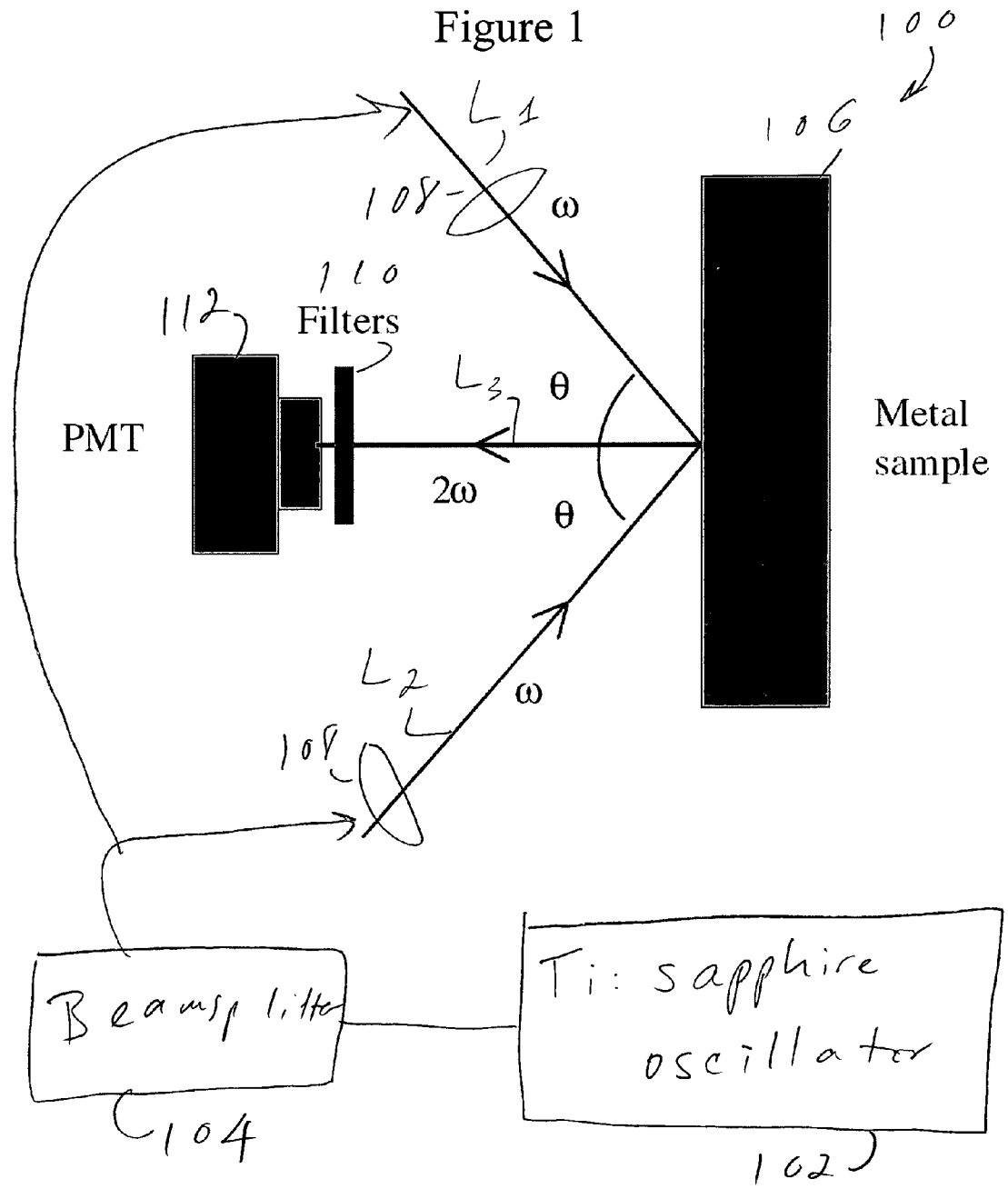
FIG. 1 shows a hardware setup according to the first preferred embodiment.

Two preferred embodiments of the present invention will be set forth in detail with reference to the drawings, in which like reference numerals refer to like elements throughout.

A first preferred embodiment will be described with reference to FIGS. 1-4. The hardware setup according to the first preferred embodiment is shown in FIG. 1 as 100. The first preferred embodiment 100 uses a femtosecond Ti:sapphire oscillator 102 running at 800 nm central wavelength with a repetition rate of 94.3 MHz. The beam from the oscillator is split into two pulse trains $L_1$, $L_2$ using a 50/50 beam splitter 104 such that each path carries nearly half the average power. The two beams $L_1$, $L_2$ are p polarized and focused onto the metal sample 106 with two identical lenses 108. The second harmonic $L_3$, generated through two-overlapping beams at the sample surface, is emitted in the normal direction. A photomultiplier tube (PMT) 112 is used to detect the surface SHG. Filters 110 transmitting 400 nm but blocking 800-nm light are mounted right in front of the PMT to effectively cut off any fundamental leakage at 800 nm.

In a validating experiment, the metal samples used are polycrystalline gold films. To obtain the autocorrelation trace, one of the beams is delayed relative to the other beam, and the photomultiplier records the intensity of the autocorrelation signal as a function of the delay between the two beams. A lock-in amplifier is used to enhance the signal-to-noise ratio.

Figure 2:
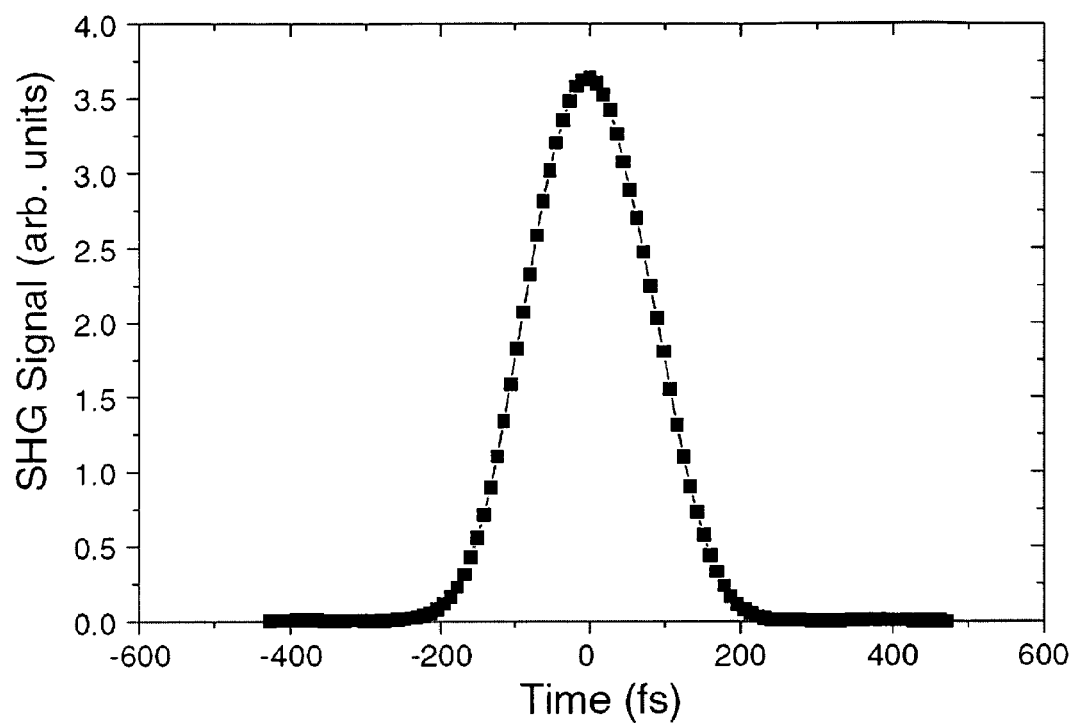
FIG. 2 shows an autocorrelation trace from the hardware setup of FIG. 1.

A typical autocorrelation trace obtained using the oscillator is shown in FIG. 2. As seen clearly, the autocorrelation traces obtained by our method exhibit a remarkably good signal-to-noise ratio. The pulse duration measured using our technique is further confirmed by regular autocorrelation measurements using a KDP nonlinear crystal. The efficiency of SHG depends on the incident angle of the fundamental beam (angle θ in FIG. 1). We find that the signal is readily detectable over a large angular range from 20° to 80°, with the peak efficiency between 65° and 70°. Typically, the time resolution of the autocorrelator at large incident angles can be improved by focusing the laser beam to a smaller spot on the metal surface. Experience and calculations show that the scheme just described is suitable for measuring pulse duration from almost any femtosecond laser oscillator.

Figure 3:
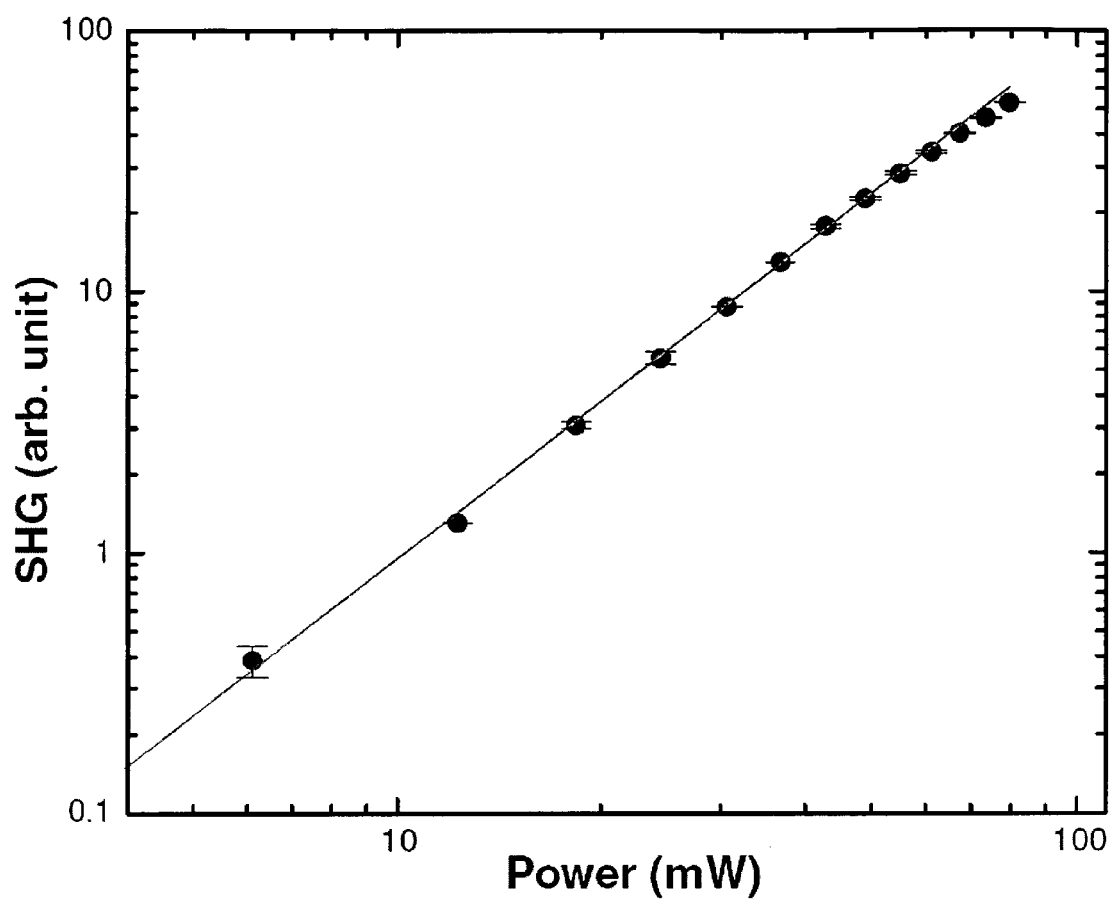
FIG. 3 shows a power dependence of the autocorrelation signal from the first preferred embodiment.

To ensure that the observed signal in the normal direction is indeed due to SHG from the gold surface, the signal strength is measured as a function of the average laser power from one beam. For two beams incident at 65°, this power dependence is shown in FIG. 3. The solid line is a quadratic fit to the data. The data are slightly reduced at the highest intensities due to detector saturation. The observed signal shows an excellent quadratic dependence on the incident beam power, as expected for any SHG signal, leaving no doubt about its origin. Furthermore, the figure shows that the autocorrelation SHG signal can be obtained with input average power level as low as 6 mW per beam from a 94.3 MHz repetition-rate oscillator. This value corresponds to a pulse energy of only 64 pJ and to an intensity level of about 6.5 $MW/cm^2$ in the experimental setup described above. Therefore, the SHG efficiency of this new technique is comparable to those based on using a bulk nonlinear crystal, even though the new technique enjoys significant advantages in terms of phase matching, dispersion, and broad spectral response. A clean SHG signal can be obtained even at lower pump power levels with additional efforts to enhance the signal-to-noise ratio.

Figure 4:
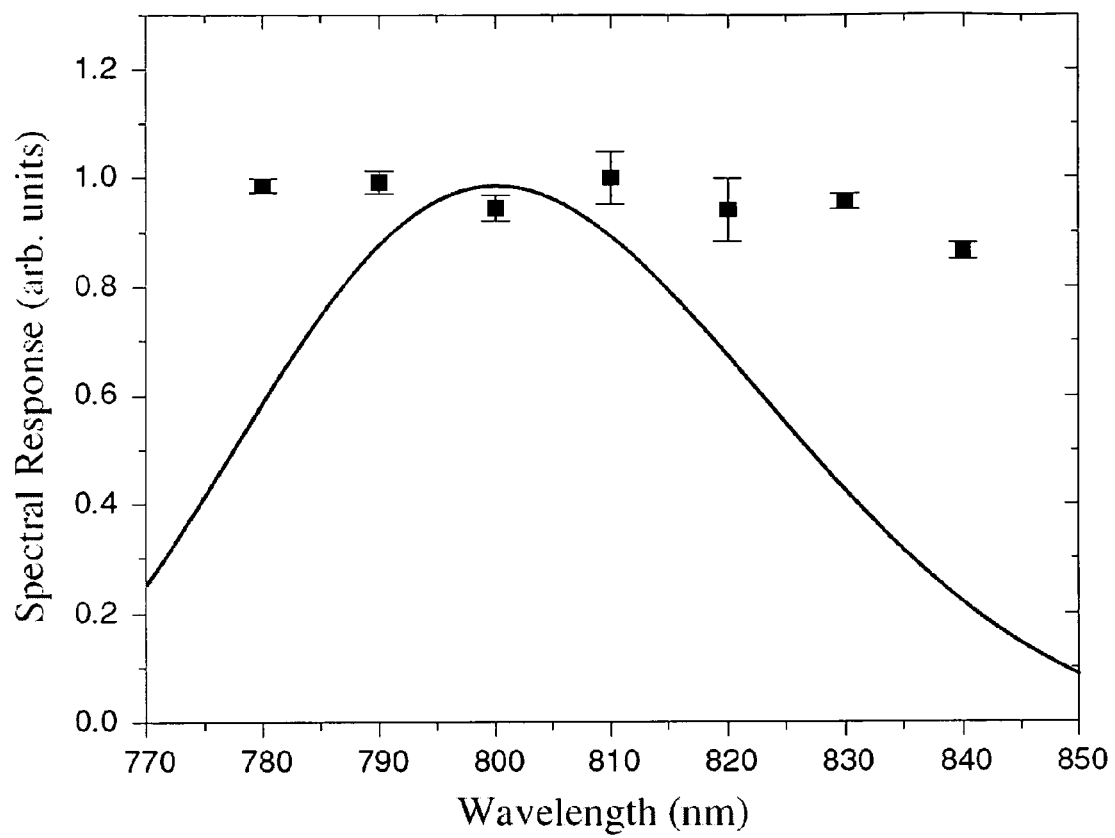
FIG. 4 shows a spectral dependence of the autocorrelation signal from the first preferred embodiment.

One of the key advantages of the metal-based autocorrelation technique is the much broader spectral range over which the SHG signal can be efficiently generated compared with other techniques. To demonstrate this feature experimentally, the Ti:sapphire oscillator has been run over a range of central wavelengths. However, due to the spectral bandwidth limitation of the optics used in the oscillator in the specific experimental setup used, stable mode-locked pulses lase only over a 780-850 nm central wavelength range. Autocorrelation signals are recorded over this wavelength range, and FIG. 4 shows the wavelength dependence of the measured peak autocorrelation signals. The solid curve shows the calculated spectral response of a 100-μm thick type-I BBO crystal assuming that the crystal is oriented at the optimal phase-matching angle (29.18°) for 800 nm light.

To account for the variations in power, pulse duration, filter and detector responsivity, and focused spot size as the wavelength is changed, the autocorrelation SHG signal is normalized by a factor of $\tau \kappa \lambda_0^2/P^2$, where τ denotes pulse duration, κ accounts for the detector and blue filter responsivity, $\lambda_0$ is the central wavelength of the pulse, and P is the incident average power. As shown in FIG. 4, the spectral response is relatively flat over the measured spectral range. For comparison, we also calculated the spectral response of a 100-μm thick type-I BBO crystal assuming that the crystal is oriented at the optimal phase-matching angle (29.18°) for 800 nm light. The calculated curve is plotted against the experimental data. It is evident from the figure that the present technique shows a significantly better spectral response compared to nonlinear-crystal-based measurements. Further tests over a broader spectral range can be carried out using different or broadly tunable light sources.

Figure 5:
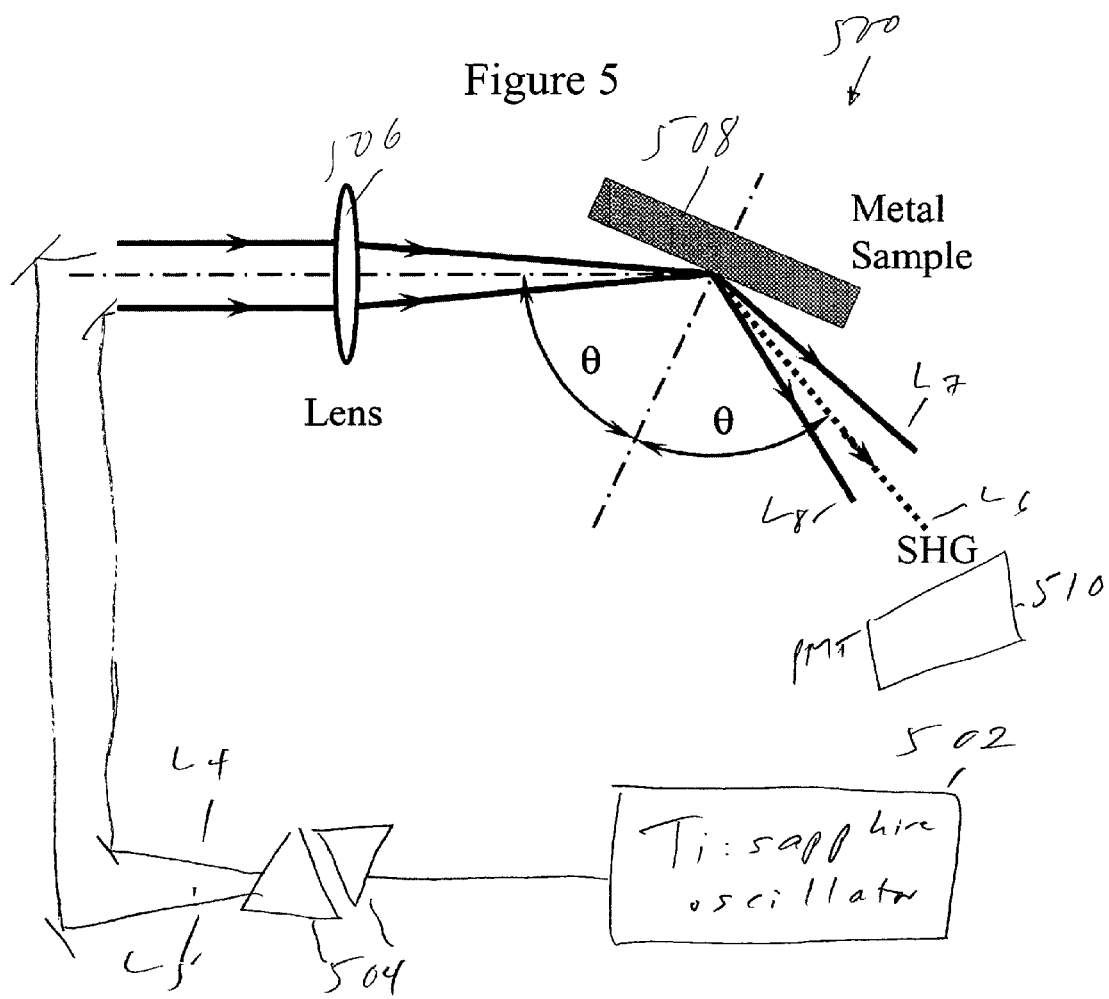
FIG. 5 shows a hardware setup according to the second preferred embodiment.

A second preferred embodiment will now be described with reference to FIGS. 5-9. The hardware setup according to the second preferred embodiment is shown in FIG. 5 as 500. In the setup 500, a self-mode-locked Ti:sapphire oscillator 502 running at 795 nm central wavelength with a repetition rate of 94 MHz is used as the femtosecond light source.

Nearly chirp-free pulses of 18 fs with a bandwidth of 40 nm can be obtained with a pair of dispersive prisms 504 for external dispersion compensation. The metal sample 508 used here is a polycrystalline gold film.

In the setup 500, the two autocorrelator arms consist of two parallel beams $L_4$, $L_5$ separated by about 10 mm. The average power of each beam is about 25 mW, and these two beams are focused to a same spot on the gold surface by a 125-mm focal-length lens 506. The two parallel beams of the autocorrelator just before the focal lens 506 have an angle θ with respect to the normal direction of the sample surface. Following the focal lens 506, the two beams have an angle of about 5° with respect to each other.

Surface SHG $L_6$ will be generated in the direction that bisects the angle between the two reflected fundamental beams $L_7$, $L_8$, dictated by the energy and momentum conservation laws when one photon from each beam is absorbed simultaneously. In the present case, the average autocorrelation SHG power is estimated to be in the order of 1 pW. The small angle between the two beams $L_7$, $L_8$ introduces a correction factor of cos(5°/2)=0.999 that has a neglected effect on pulse spatial blurring. The autocorrelation function is obtained by recording the SHG signal with a photomultiplier tube (PMT) 510 as a function of time delay between the two pulses from each arm.

Although the dependence of SHG intensity on the light polarization and incident angle have been studied in the past with a single incident beam, it was not clear a priori that the same dependence would hold true for the autocorrelation SHG signal that results from two interacting beams. In other words, it was not clear a priori if the autocorrelation SHG generated from two incident pulses in the direction bisecting the two reflected beams would have the same dependence on the incident angle and light polarization as the SHG generated from a single incident beam in the reflection direction. To study the polarization effect, the inventors set the incident angle around 70° at which maximum SHG from a single incident beam was obtained. One incident beam was kept p polarized, and the polarization of the other beam was varied from p to s. Autocorrelation traces were recorded at different polarization angle for one of the incident beams while keeping the other beam p polarized.

Figure 6:
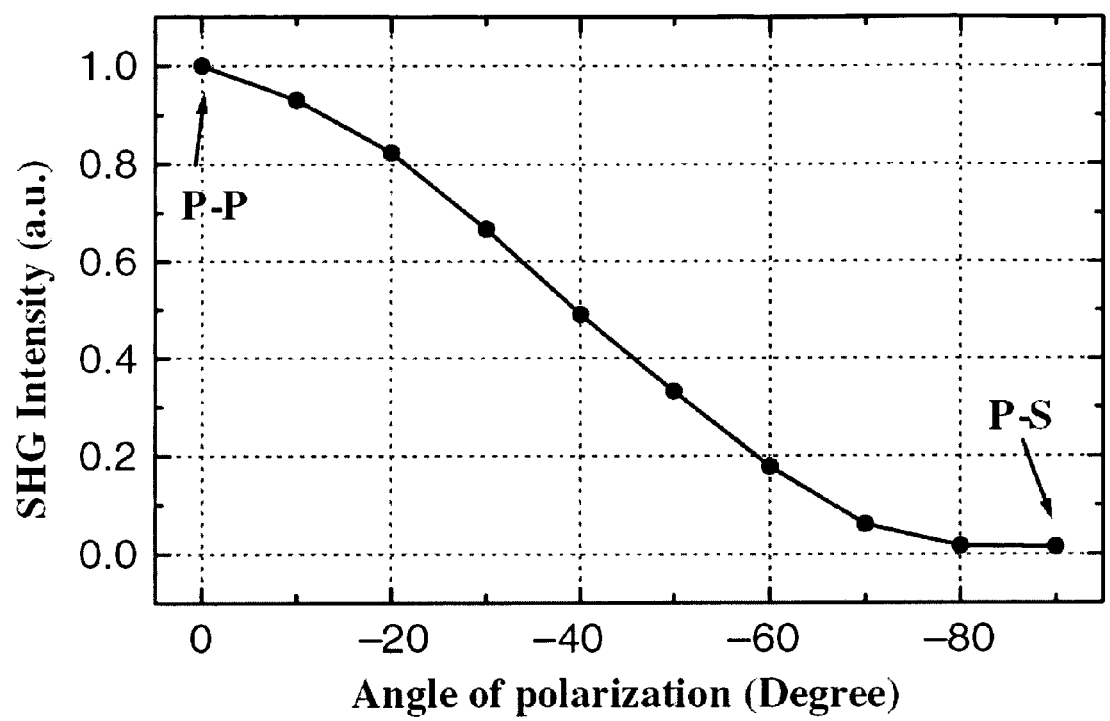
FIG. 6 shows a polarization dependence of the autocorrelation signal from the second preferred embodiment.

The peak values of the autocorrelation traces as a function of the polarization angle of one beam are plotted in FIG. 6. The results show that, when the polarization of both beams is p, the peak autocorrelation SHG signal is maximized; the SHG signal decreases to a minimum value when the polarization of the two beams is crossed (p and s). This autocorrelation SHG signal shows the same polarization dependence as the SHG signal generated from a single beam from metal surfaces.

Next, the inventors studied the dependence of autocorrelation SHG signal strength on incident beam angle. The incident beam angle, θ, is the angle between the two parallel incident beams and the sample normal direction, as shown in FIG. 5. In this experiment, the polarization of both incident beams is set as p since the autocorrelation SHG signal is the highest according to the results in FIG. 6. To vary θ, the sample is carefully aligned to ensure that its rotation axis is perpendicular to the incident plane and goes through the common focal point of the two incident beams on the gold sample.

Figure 7:
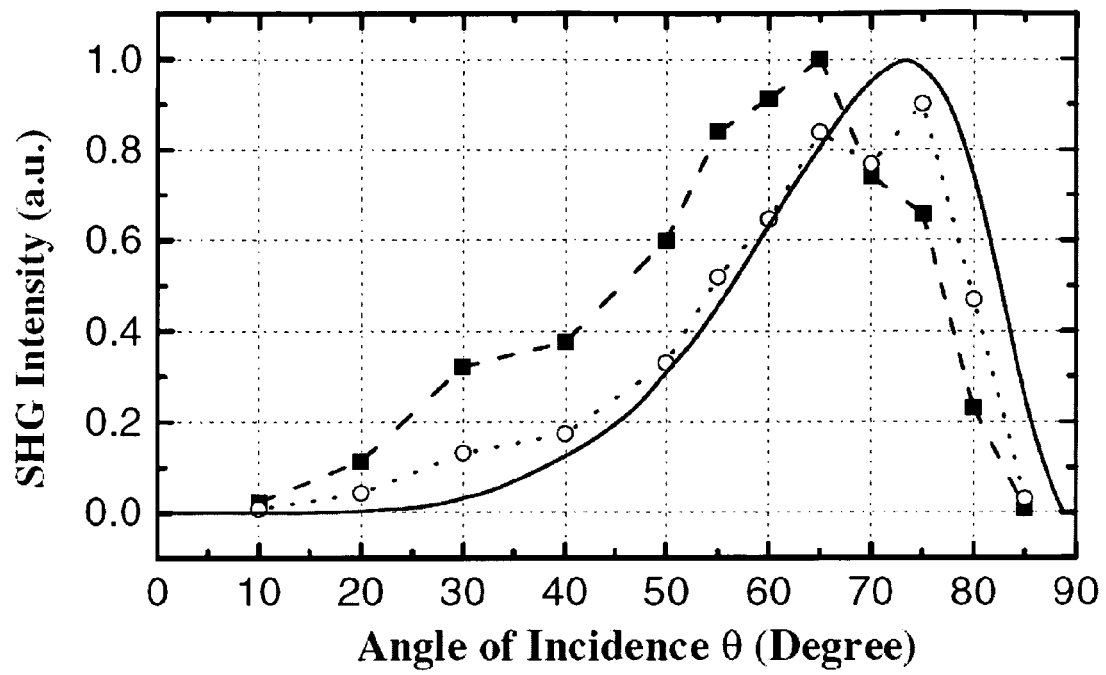
FIG. 7 shows an angular dependence of the autocorrelation signal from the second preferred embodiment.

Autocorrelation traces are recorded at each incident angle θ and again, the peak value of each autocorrelation trace is plotted in FIG. 7 at different incident angles. The squared symbols are the data that do not take into account of the intensity variation at different angles; the open circle symbols are the data that take into account of the intensity variation at different angles; the solid line reproduces model calculations.

Since the incident beam intensity on the metal sample varies with the incident angle, the inventors further corrected this effect and re-plotted the SHG autocorrelation signal resulting from a constant incident intensity (FIG. 7). The figure shows that the corrected autocorrelation SHG signal shows virtually the same dependence on incident angle as the theoretical predication based on single-beam SHG signal as well as single-beam experimental measurements. We can see that the autocorrelation signal reaches the maximum at θ=65° the intensity correction but at 70° after the intensity correction.

To test the capability of this metal-based autocorrelation technique in characterizing ultrafast pulses, the inventors performed second- and third-order interferometric autocorrelation measurements on ultrafast pulses from the Ti:sapphire oscillator by switching to a two-incident-beam collinear setup. The near-collinear setup discussed above has only a very small angle of 5° between the two focusing beams (FIG. 5) and a correction factor of cos(5°/2)=0.999. Thus, the optimized autocorrelation SHG condition determined above should also be a good approximation for a pure collinear setup. Therefore, for second-order interferometric autocorrelation measurement, we set the incident angle θ to be 65° with both beams p-polarized. The second-order interferometric autocorrelation traces are obtained and plotted in FIG. 8. The second-order interferometric autocorrelation traces (solid lines) are obtained from (a) the two-photon absorption technique and (b) the metal-based surface SHG technique. The dashed lines are the envelopes of the calculated second-order interferometric autocorrelation traces of 18-fs chirp-free pulses at a central wavelength of 795 nm.

Figure 8:
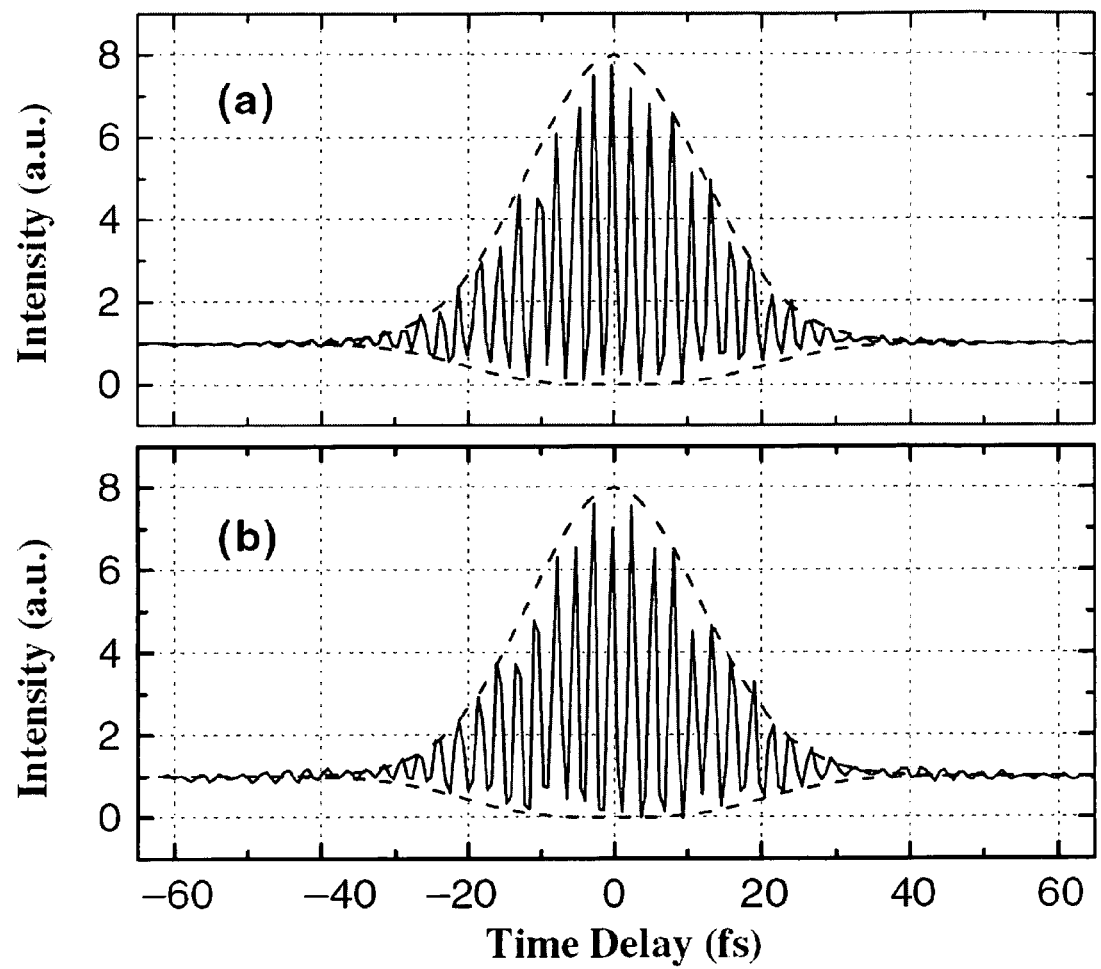
FIG. 8 shows second-order interferometric autocorrelation traces obtained from the two-photon absorption technique and the metal-based surface SHG technique according to the second preferred embodiment.

For comparison, second-order interferometric autocorrelation measurements on the same pulses are also obtained using the two-photon absorption technique with a GaAsP photodetector. In FIG. 8, plots (a) and (b) show the interferometric autocorrelation traces obtained by the TPA-based setup and metal-based setup, respectively. In the figure, the dashed lines show the envelopes of the calculated interferometric autocorrelation traces of 18-fs chirp-free pulses. As shown in the figure, the two interferometric traces are almost identical, demonstrating that the metal-based autocorrelation technique has the same capability for measuring sub-20-fs ultrashort pulses as the TPA-based technique.

However, if one looks carefully at the two wings of each interferometric autocorrelation trace in FIG. 8, one subtle but interesting difference can be noticed between the two traces. The interferometric autocorrelation trace obtained from the metal-based technique contains more pronounced oscillations on both wings, in the delay range of −50 to −35 fs and 35-50 fs. This is likely an indication of some small chirp in the pulses used for the metal-based autocorrelation measurements. This is interesting because identical pulses are actually used for both metal-based and TPA-based measurements. A more careful examination of the pulse-chirp minimization procedure reveals that we always start with the TPA setup to monitor the interferometric autocorrelation trace and minimize the pulse chirp and then the supposed chirp-free pulses are measured with both TPA-based and metal-based setups. However, the TPA technique relies on the two-photon absorption process inside a GaAsP photodetector, and femtosecond laser pulses need to penetrate through a focusing/protective lens in front of the GaAsP material (comes along with the detector) and also penetrate into the GaAsP material over a certain distance to generate an overall output signal through the TPA process. Thus, some small but existing dispersion should be present in the TPA setup. Therefore, the chirp-minimization process using the TPA technique will leave an unavoidable negative chirp in ultrashort pulses because of this intrinsic dispersion associated with the TPA technique. When we switch to the metal-based technique to measure these same pulses, this small dispersion can be reflected in our metal-based autocorrelation traces since the metal-based setup has less intrinsic dispersion giving that surface SHG signal is generated only from a few top atomic layers in a metal. To verify our speculation, we introduce a little positive chirp into our pulses by adjusting the chirp-compensation prism pair. The oscillation signature on both wings in FIG. 8, trace (b) can be reduced and the more identical interferometric traces can be obtained as that using the TPA autocorrelator. Therefore, we believe that our metal-based autocorrelation technique is more precise than the TPA-based technique for truly dispersion-free measurements of the duration of ultrashort optical pulses.

It is also very straightforward to perform higher-order autocorrelation measurements using the metal-based technique. It has been shown that higher-order harmonics up to fifth-order can be generated and detected from metals. Experimentally, we switch our collinear experimental setup from detecting second-order autocorrelation signal to third-order one by simply replacing a 400 nm-bandpass filter by a 266 nm-bandpass filter in front of the PMT.

Figure 9:
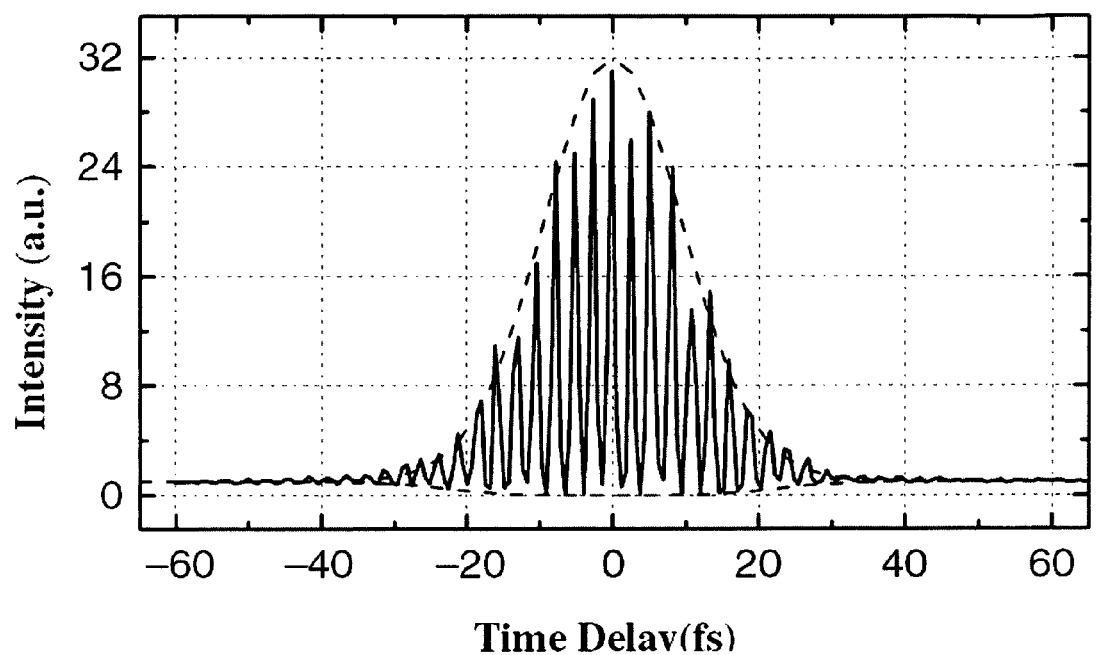
FIG. 9 shows a third-order interferometric autocorrelation trace obtained from the second preferred embodiment.

FIG. 9 shows the third-order interferometric autocorrelation trace. A third-order interferometric autocorrelation trace obtained from the metal-based autocorrelation technique is shown as a solid line. The dashed line is the envelop of the calculated third-order interferometric autocorrelation trace of 18-fs chirp-free pulses at a central wavelength of 795 nm.

The envelope of the third-order interferometric trace again agrees well with the calculation of the same 18-fs chirp-free pulses, as for the second-order autocorrelation traces. This demonstrates that our metal-based autocorrelation technique is a reliable and convenient way for ultrashort pulse measurements. From FIG. 9, we observe a peak-to-background ratio of 32:1, and this agrees with the third-order autocorrelation calculations and experimental results obtained by other researchers by using a technique based on third-harmonic generation from the surface of a glass slide.

In contrast to the first preferred embodiment, which introduces spatial blurring due to the large angle between the two incident beams, the second preferred embodiment uses a linear setup and provides both second- and third-order interferometric autocorrelation traces. Pulses as short as 18 fs have been measured and the results are compared to the TPA technique. The metal-based technique has less intrinsic dispersion compared to the TPA technique. Measurements of pulses as short as 6 fs have been demonstrated with the TPA technique and therefore, we expect our technique has potential capacity to measure pulses even shorter than 6 fs. This metal-based technique has significant advantages over the traditional non-linear crystal-based autocorrelation techniques because it is dispersion-free, provides automatic phase matching, and is capable of responding over an extremely wide spectral range. The results presented herein further demonstrates the potential suitability of this metal-based technique as a strongest candidate for temporally characterizing any light source with a super-broad spectrum, such as those produced from photonic-crystal fibers.

While two preferred embodiments and variations thereon have been set forth above, those skilled in the art who have reviewed the present disclosure will readily appreciate that other embodiments can be realized within the scope of the invention. For example, numerical values and recitations of specific materials are illustrative rather than limiting. Also, limitations caused by the use of specific hardware can be alleviated by the use of different hardware with different operating parameters. Moreover, the sources of the signals to be correlated can be any sources appropriate for the intended purpose. Therefore, the present invention should be construed as limited only by the appended claims.

I claim:

1. A method for autocorrelating two optical signals, the method comprising:
    (a) causing the two optical signals to be incident on a single location on a metal surface to produce a harmonic generation signal;
    (b) detecting the harmonic generation signal produced in step (a); and
    (c) obtaining a correlation function from the harmonic generation signal detected in step (b).

2. The method of claim 1, wherein the harmonic generation signal comprises a second harmonic generation signal.

3. The method of claim 2, wherein the harmonic generation signal further comprises a harmonic generation signal of order higher than the second order.

4. The method of claim 1, wherein the metal comprises gold.

5. The method of claim 4, wherein the metal comprises polycrystalline gold.

6. The method of claim 1, wherein the two optical signals are parallel until they are focused onto the single location.

7. The method of claim 1, wherein the two optical signals are incident on the metal surface from opposite angles relative to a normal to the metal surface.

8. The method of claim 1, wherein the two optical signals are collinearly incident on the metal surface.

9. A device for autocorrelating two optical signals, the device comprising:
    a body having a metal surface;
    optics for causing the two optical signals to be incident on a single location on the metal surface to produce a harmonic generation signal; and
    a detector for detecting the harmonic generation signal and obtaining a correlation function from the harmonic generation signal.

10. The device of claim 9, wherein the harmonic generation signal comprises a second harmonic generation signal.

11. The device of claim 10, wherein the harmonic generation signal further comprises a harmonic generation signal of order higher than the second order.

12. The device of claim 9, wherein the body comprises gold.

13. The device of claim 12, wherein the body comprises polycrystalline gold.

14. The device of claim 9, wherein the two optical signals are parallel until they are focused onto the single location by the optics.

15. The device of claim 9, wherein the two optical signals are incident on the metal surface from opposite angles relative to a normal to the metal surface.

16. The device of claim 9, wherein the two optical signals are collinearly incident on the metal surface.

* * * * *